United States Patent
Blythe et al.

(10) Patent No.: US 9,964,057 B2
(45) Date of Patent: May 8, 2018

(54) METHOD AND SYSTEM FOR ADJUSTING ENGINE CYLINDER OPERATION

(71) Applicant: General Electric Company, Schenectady, NY (US)

(72) Inventors: Neil Xavier Blythe, North East, PA (US); Daniel Edward Loringer, Erie, PA (US); Matthew John Malone, Boulder, CO (US)

(73) Assignee: General Electric Company, Schenectady, NY (US)

( * ) Notice: Subject to any disclaimer, the term of this patent is extended or adjusted under 35 U.S.C. 154(b) by 249 days.

(21) Appl. No.: 14/886,934

(22) Filed: Oct. 19, 2015

(65) Prior Publication Data

US 2017/0107924 A1  Apr. 20, 2017

(51) Int. Cl.
| | |
|---|---|
| F02D 41/00 | (2006.01) |
| F02B 37/18 | (2006.01) |
| F02D 41/22 | (2006.01) |
| F02B 37/013 | (2006.01) |
| F02B 37/00 | (2006.01) |

(52) U.S. Cl.
CPC .......... *F02D 41/0085* (2013.01); *F02B 37/18* (2013.01); *F02D 41/0007* (2013.01); *F02D 41/008* (2013.01); *F02D 41/009* (2013.01); *F02D 41/0065* (2013.01); *F02D 41/221* (2013.01); *F02B 37/004* (2013.01); *F02B 37/013* (2013.01); *F02D 41/0025* (2013.01); *F02D 41/0027* (2013.01); *F02D 2200/1015* (2013.01); *Y02T 10/144* (2013.01); *Y02T 10/47* (2013.01)

(58) Field of Classification Search
CPC ..... F02D 35/023; F02B 37/013; Y02T 10/144
See application file for complete search history.

(56) References Cited

U.S. PATENT DOCUMENTS

| | | | |
|---|---|---|---|
| 8,006,676 B2 * | 8/2011 | Tabata | F02D 41/0085 123/564 |
| 8,191,370 B2 * | 6/2012 | Shimizu | F02D 41/0007 123/445 |
| 8,402,953 B2 * | 3/2013 | Kawabe | F02D 41/0007 123/478 |
| 9,121,862 B2 * | 9/2015 | Reitmeier | F02D 41/0007 |

OTHER PUBLICATIONS

Ponti, et al; Estimation Methodology for Automotive Turbochargers Speed Fluctuations Due to Pulsating Flows; ICEF Oct. 2014; Columbus, IN US.

* cited by examiner

*Primary Examiner* — Mary A Davis
(74) *Attorney, Agent, or Firm* — GE Global Patent Operation; John A. Kramer

(57) ABSTRACT

Various methods and systems are provided for diagnosing individual engine cylinders based on a turbocharger speed fluctuation of a turbocharger. In one embodiment, a method for an engine includes adjusting engine operation based on an indicated operating parameter of an individual engine cylinder, where the indicated operating parameter is based on at least one turbocharger speed fluctuation of a turbocharger correlated with crankshaft position.

21 Claims, 6 Drawing Sheets

METHOD AND SYSTEM FOR ADJUSTING ENGINE CYLINDER OPERATION

TECHNICAL FIELD

Embodiments of the subject matter disclosed herein relate to a turbocharger and adjusting engine operation based on operating parameters of the turbocharger.

DISCUSSION OF ART

A multi-cylinder engine includes a plurality of individual cylinders. Each cylinder combusts air and fuel to power the engine. Over time, individual cylinders and/or components coupled to the individual cylinders (e.g., exhaust valves) may become degraded. Further, since fueling may be individually controlled for each cylinder, fueling may become uneven between all the cylinders of the engine. If individual cylinders are not being fueled accurately, or cylinders become degraded, engine misfire may occur and/or the efficiency of the engine may decrease. However, determining the health of individual cylinders is challenging. For example, current methods for diagnosing individual engine cylinders may require specialized components and personnel for collecting data to make a diagnosis. This may result in increased costs and time for diagnosis. Additionally, methods including monitoring fluctuations in crankshaft speed may have reduced accuracy in engines with a larger number of cylinders (e.g., 12 to 24 cylinders).

BRIEF DESCRIPTION

In one embodiment, a method for an engine (e.g., a method for controlling an engine system) comprises adjusting engine operation based on an indicated operating parameter of an individual engine cylinder, where the indicated operating parameter is based on at least one turbocharger speed fluctuation of a turbocharger correlated with crankshaft position.

DETAILED DESCRIPTION

The following description relates to embodiments of adjusting engine operation based on an indicated operating parameter of an individual engine cylinder, where the indicated operating parameter is based on at least one turbocharger speed fluctuation of a turbocharger correlated with crankshaft position. The indicated operating parameter of the individual engine cylinder may include one or more of engine misfire, engine knock, a total fueling amount that is above or below a threshold value range, a fueling ratio between a first and second fuel in a multi-fuel engine system, degradation of the individual cylinder, degradation of a fuel injector that is configured to supply fuel to the individual engine cylinder, and/or degradation of an exhaust valve of the individual engine cylinder. The turbocharger speed fluctuation may be estimated and/or measured from an output of a turbocharger speed sensor coupled to the turbocharger. As one example, the turbocharger speed sensor may be coupled to a shaft of the turbocharger and may output a time-varying signal of the turbocharger speed. The turbocharger speed fluctuations may represent exhaust pulses delivered to the turbocharger turbine from individual cylinders and thus may be the portions of the time-varying signal that deviate from a baseline or average value of the turbocharger speed. Adjusting engine operation may include adjusting one or more of fueling to the individual cylinder, timing of an exhaust valve of the individual cylinder, a fueling ratio of multiple fuels combusted at the individual cylinder, or the like.

Figure 1:
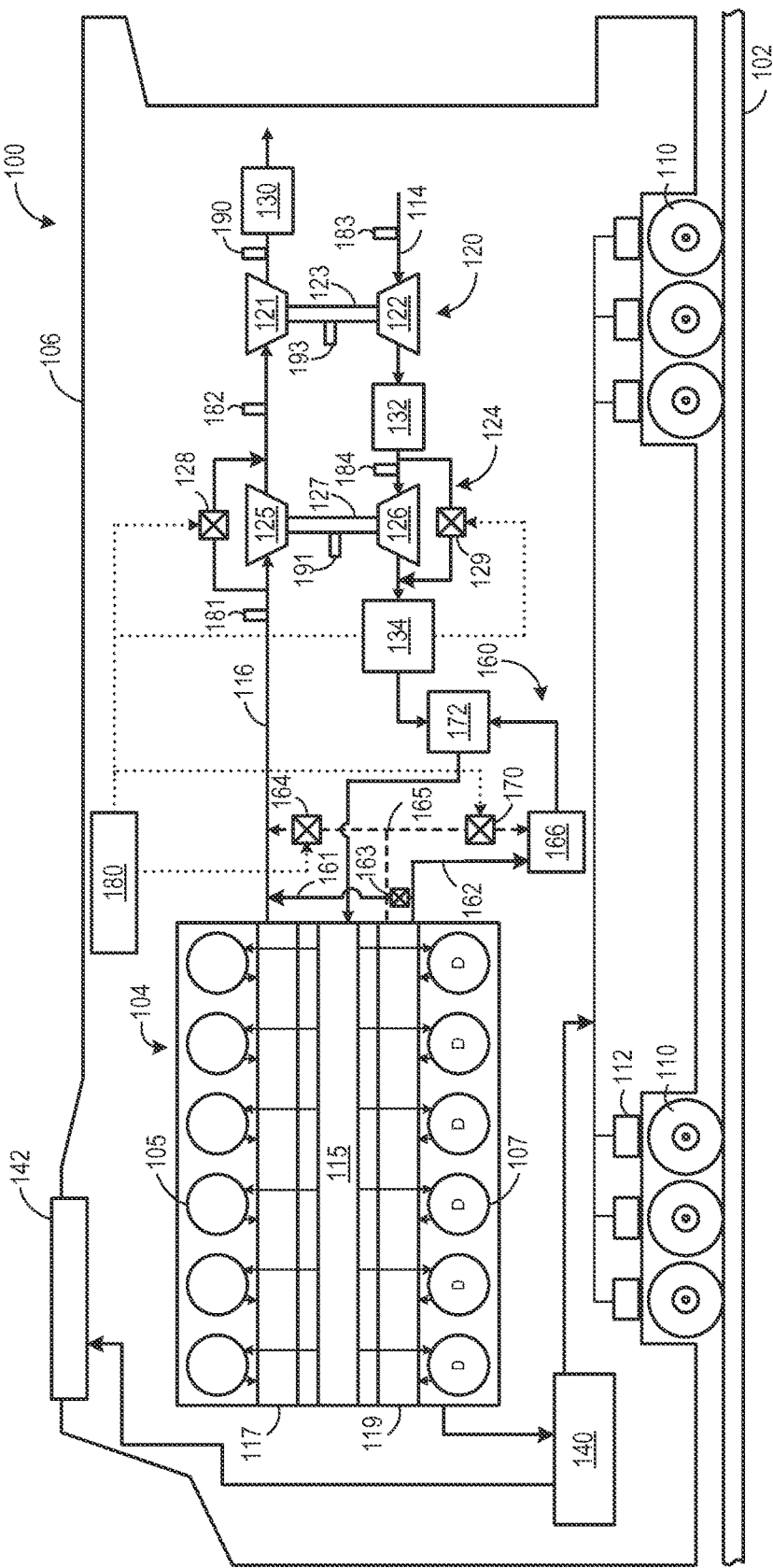
FIG. 1 shows a schematic diagram of a rail vehicle with an engine according to an embodiment of the invention.
Figure 2:
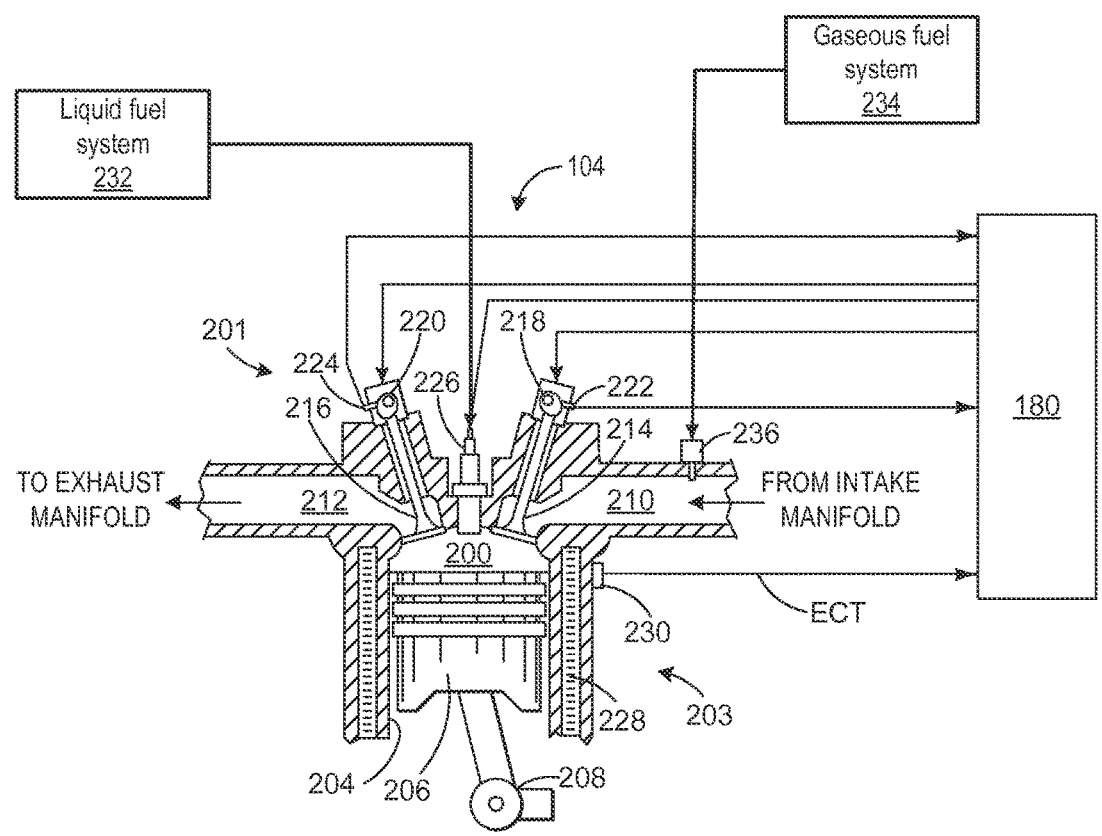
FIG. 2 shows a schematic diagram of an example cylinder of a multi-fuel engine according to an embodiment of the invention.
Figure 3:
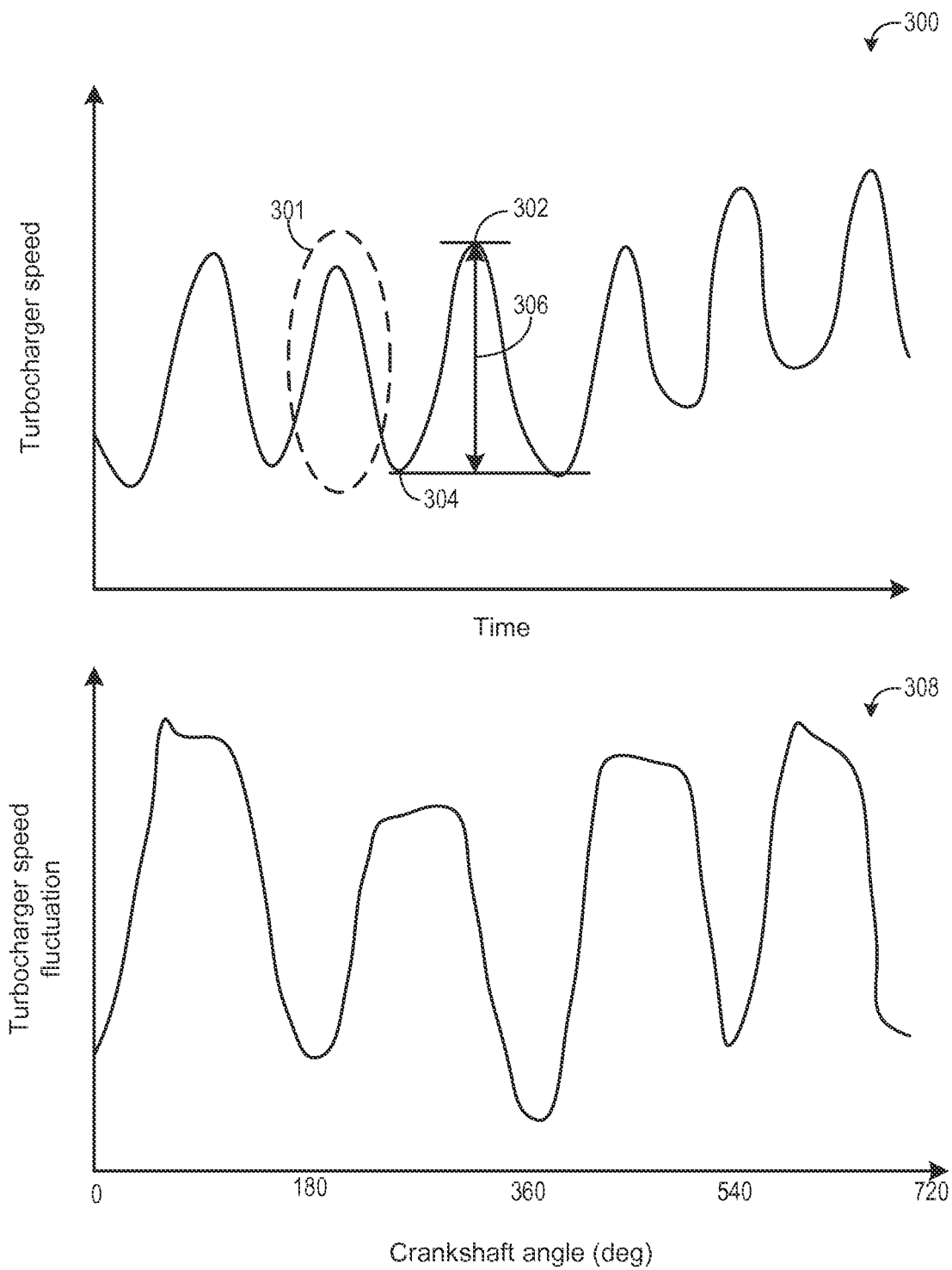
FIG. 3 shows graphs of turbocharger speed fluctuations over time and turbocharger speed fluctuations correlated with crankshaft position according to an embodiment of the invention.
Figure 4:
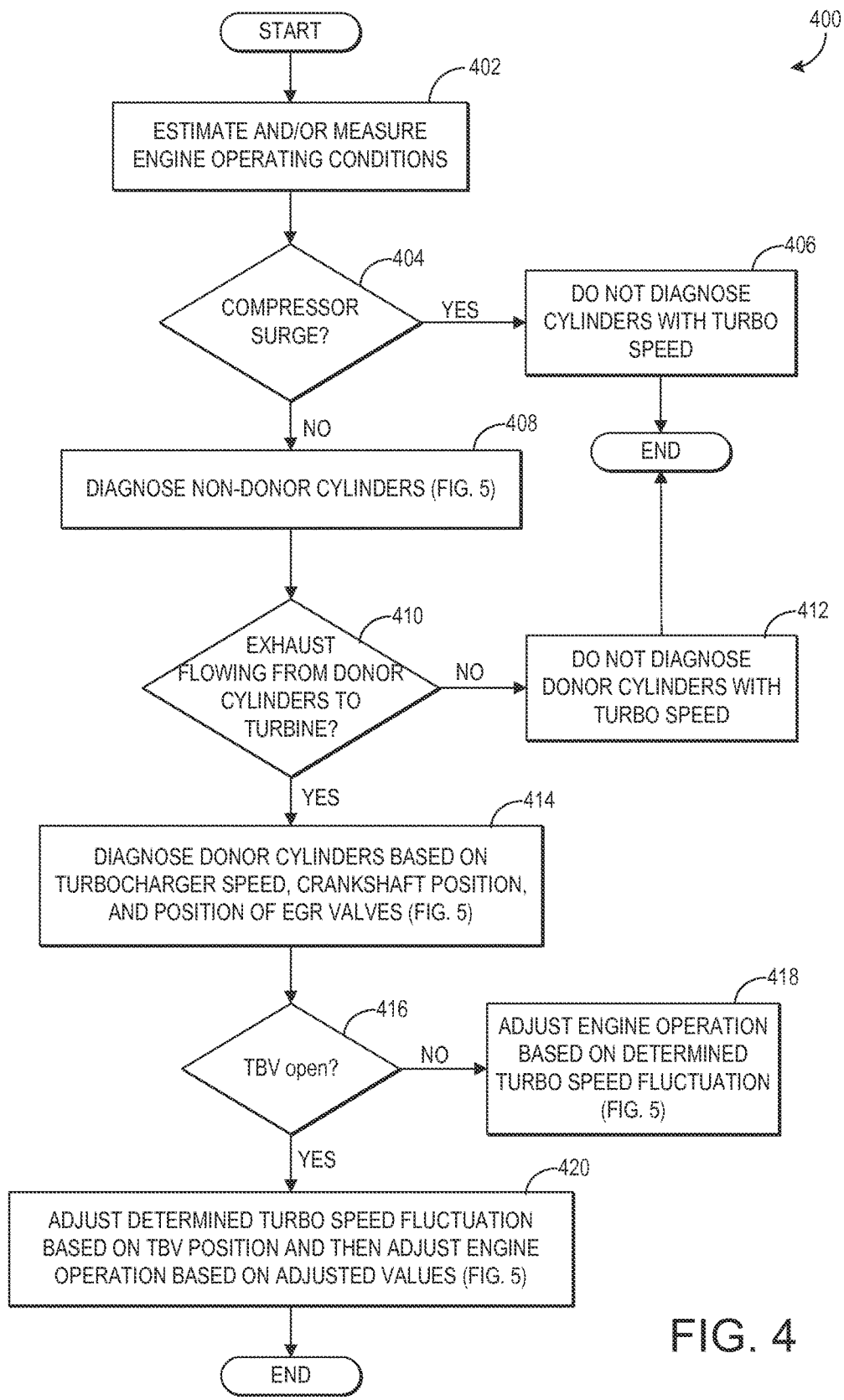
FIG. 4 shows a flow chart of a method for determining when to perform a diagnostic for individual cylinders of an engine according to an embodiment of the invention.
Figure 5:
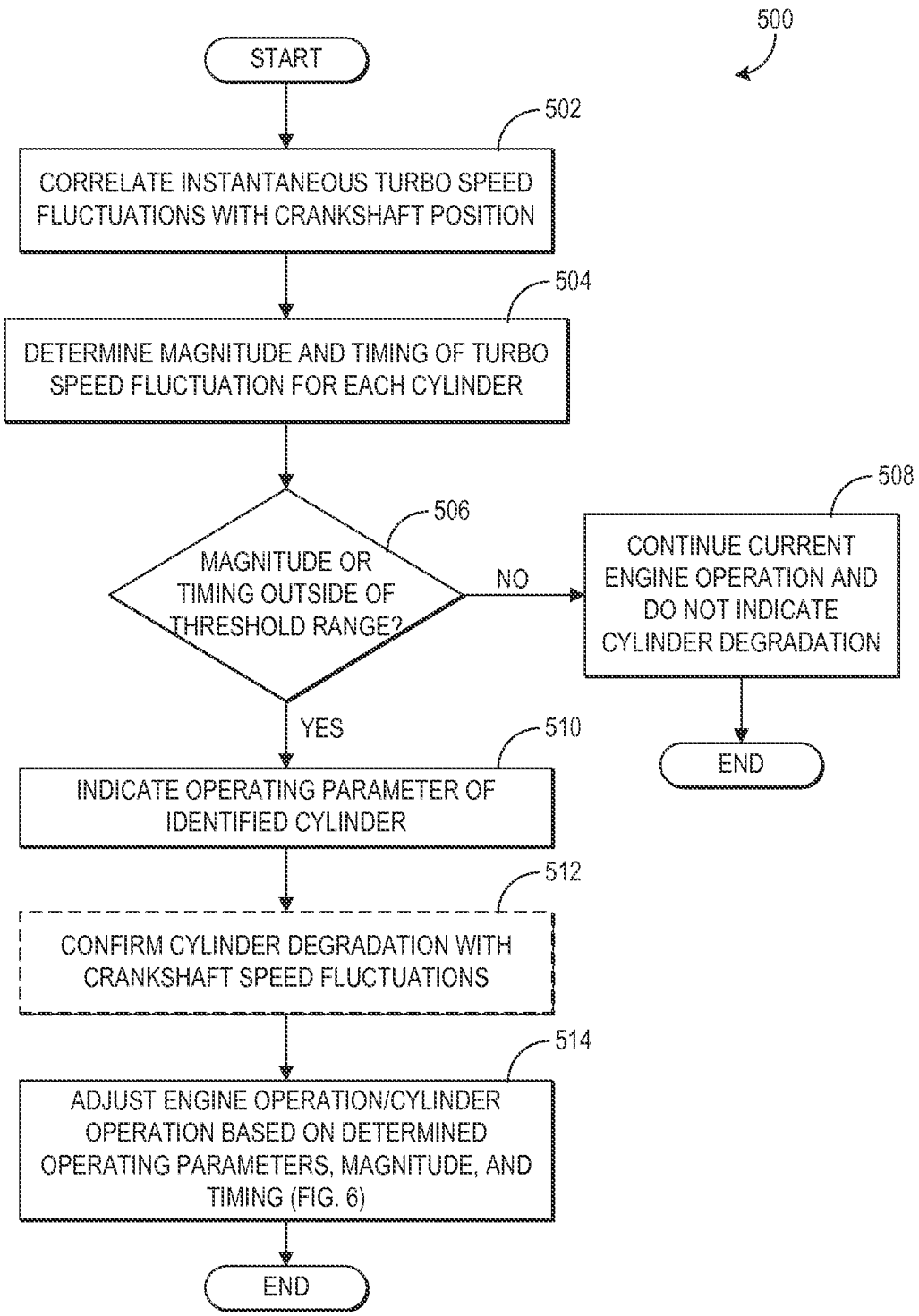
FIG. 5 shows a flow chart of a method for determining an operating parameter of an individual cylinder based on turbocharger speed fluctuations of a turbocharger according to an embodiment of the invention.
Figure 6:
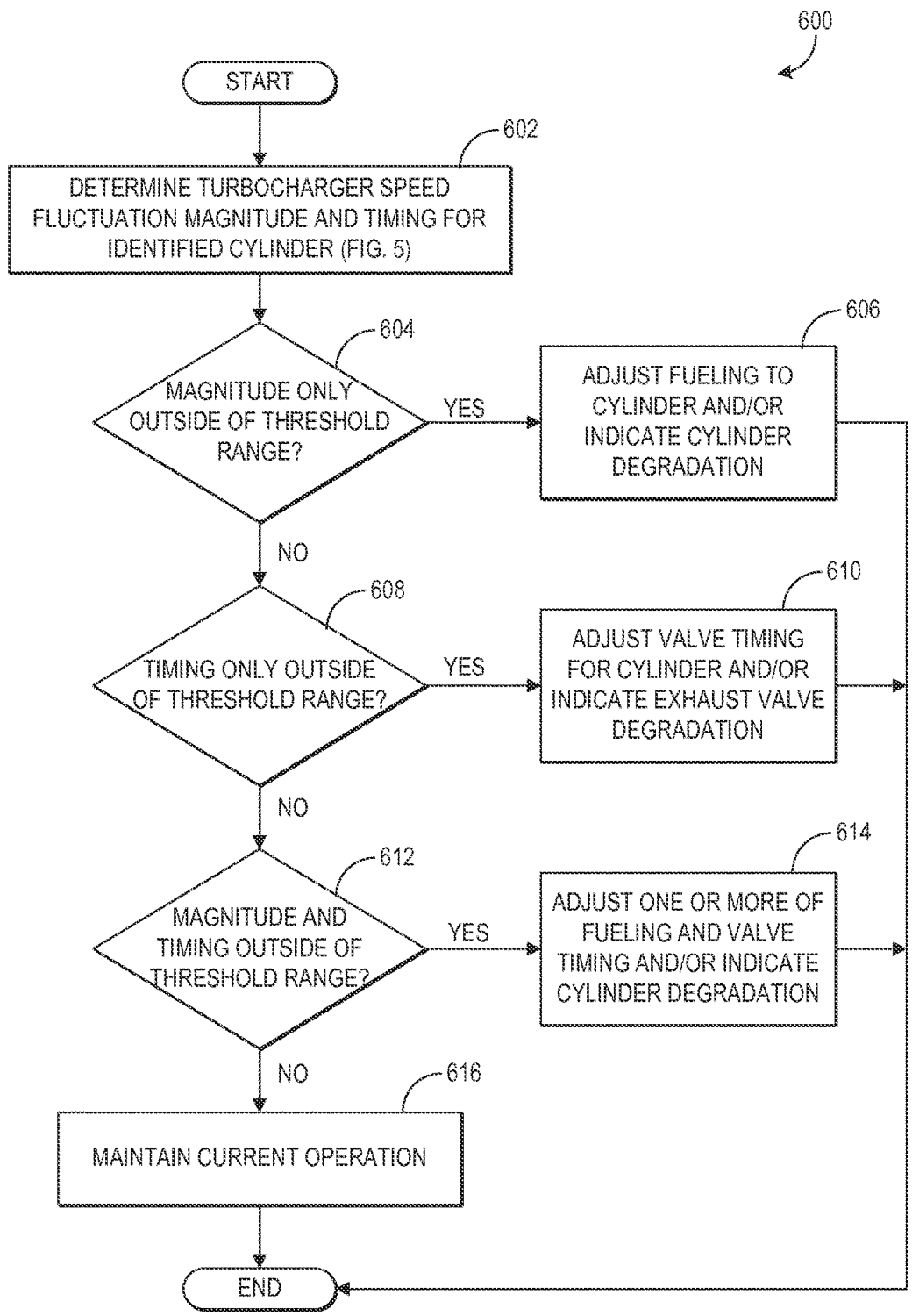
FIG. 6 shows a flow chart of a method for adjusting engine operation based on a magnitude and/or timing of a turbocharger speed fluctuation for an individual cylinder according to an embodiment of the invention.

FIG. 1 shows an example of a vehicle in which an engine is installed, such as a rail vehicle. The engine may include a plurality of engine cylinders and one or more turbochargers. An example of a single cylinder of the engine, which may combust two fuels, such as natural gas and diesel fuel, is shown in FIG. 2. A turbocharger includes a turbine disposed in an exhaust passage of the engine that drives a compressor of the turbocharger. An engine controller may receive an output from a turbocharger speed sensor of the turbocharger. As shown in FIG. 3, the turbocharger speed is not constant and instead fluctuates over time. Each of the turbocharger speed fluctuations (e.g., peaks) may correspond to an exhaust pulse received at the turbine from an individual cylinder. By correlating these turbocharger speed fluctuations to crankshaft position (e.g., crankshaft angle), the controller may determine which turbocharger speed fluctuation corresponds to which engine cylinder. A magnitude and timing of each turbocharger speed fluctuation may be determined for each cylinder and then used to diagnose operation of each cylinder. However, as shown at FIG. 4, this diagnosis using turbocharger speed fluctuations and cylinder operation adjustments based on the diagnosis may only be performed for certain cylinders under certain engine operation conditions. After determining that individual cylinder diagnosis based on the turbocharger speed fluctuations may be performed, the engine controller may indicate operating parameters of the individual cylinders and/or adjust operation of the individual cylinders based on the determined magnitude and timing of each turbocharger speed fluctuation, as shown at FIG. 5. As shown in FIG. 6, the type of adjustment to the individual cylinder may be based on which of the magnitude and/or timing of the turbocharger speed fluctuation of the individual cylinder is outside of threshold ranges. In this way, individual cylinder operation may be adjusted based on turbocharger speed fluctuations of the turbocharger, thereby increasing engine efficiency and reducing instances of engine knock and misfire.

The approach described herein may be employed in a variety of engine types, and a variety of engine-driven systems. Some of these systems may be stationary, while others may be on semi-mobile or mobile platforms. Semi-mobile platforms may be relocated between operational periods, such as mounted on flatbed trailers. Mobile platforms include self-propelled vehicles. Such vehicles can include on-road transportation vehicles, as well as mining equipment, marine vessels, rail vehicles, and other off-highway vehicles (OHV). For clarity of illustration, a locomotive is provided as an example of a mobile platform supporting a system incorporating an embodiment of the invention.

Before further discussion of the approach for adjusting engine operation and diagnosing individual cylinders of an engine system based on speed fluctuations of a turbocharger of the engine system, an example of a platform is disclosed in which the engine system may be installed in a vehicle, such as a rail vehicle. For example, FIG. 1 shows a block diagram of an embodiment of a vehicle system 100 (e.g., a locomotive system), herein depicted as a rail vehicle 106, configured to run on a rail 102 via a plurality of wheels 110. As depicted, the rail vehicle includes an engine 104. In other non-limiting embodiments, the engine may be a stationary engine, such as in a power-plant application, or an engine in a marine vessel or off-highway vehicle propulsion system as noted above. In one embodiment herein, the engine is a multi-fuel engine operating with diesel fuel and natural gas, but in other examples the engine may use various combinations of fuels other than diesel and natural gas.

The engine receives intake air for combustion from an intake, such as an intake manifold 115. The intake may be any suitable conduit or conduits through which gases flow to enter the engine. For example, the intake may include the intake manifold, an intake passage 114, and the like. The intake passage receives ambient air from an air filter (not shown) that filters air from outside of a vehicle in which the engine may be positioned. Exhaust gas resulting from combustion in the engine is supplied to an exhaust, such as an exhaust passage 116. The exhaust may be any suitable conduit through which gases flow from the engine. For example, the exhaust may include an exhaust manifold 117, the exhaust passage, and the like. Exhaust gas flows through the exhaust passage, and out of an exhaust stack of the rail vehicle. In one example, the engine is a diesel engine that combusts air and diesel fuel through compression ignition. In other non-limiting embodiments, the engine may combust fuel including gasoline, kerosene, biodiesel, or other petroleum distillates of similar density through compression ignition (and/or spark ignition).

In one embodiment, the rail vehicle is a diesel-electric vehicle. As depicted in FIG. 1, the engine is coupled to an electric power generation system, which includes an alternator/generator 140 and electric traction motors 112. For example, the engine is a diesel engine that generates a torque output that is transmitted to the alternator/generator which is mechanically coupled to the engine. The alternator/generator produces electrical power that may be stored and applied for subsequent propagation to a variety of downstream electrical components. As an example, the alternator/generator may be electrically coupled to a plurality of traction motors and the alternator/generator may provide electrical power to the plurality of fraction motors. As depicted, the plurality of traction motors are each connected to one of a plurality of wheels to provide tractive power to propel the rail vehicle. One example configuration includes one traction motor per wheel. As depicted herein, six pairs of traction motors correspond to each of six pairs of wheels of the rail vehicle. In another example, alternator/generator may be coupled to one or more resistive grids 142. The resistive grids may be configured to dissipate excess engine torque via heat produced by the grids from electricity generated by alternator/generator.

In the embodiment depicted in FIG. 1, the engine is a V-12 engine having twelve cylinders. In other examples, the engine may be a V-6, V-8, V-10, V-16, I-4, I-6, I-8, opposed 4, or another engine type. As depicted, the engine may include a subset of non-donor cylinders 105, which includes six cylinders that supply exhaust gas exclusively to a non-donor cylinder exhaust manifold 117, and a subset of donor cylinders 107, which includes six cylinders that supply exhaust gas exclusively to a donor cylinder exhaust manifold 119. In other embodiments, the engine may include at least one donor cylinder and at least one non-donor cylinder. For example, the engine may have four donor cylinders and eight non-donor cylinders, or three donor cylinders and nine non-donor cylinders. It should be understood, the engine may have any desired numbers of donor cylinders and non-donor cylinders, with the number of donor cylinders typically lower than the number of non-donor cylinders. In yet another embodiment, the engine may not include any donor cylinders and instead include only non-donor cylinders. In another embodiment, exhaust gas recirculation (EGR) may be provided from a bank of cylinders supplying a manifold with exhaust and then this exhaust may be supplied to an air intake. In some embodiments, all cylinders of the engine may selectively provide EGR to an engine intake passage via an EGR system, as explained further below.

As depicted in FIG. 1, the non-donor cylinders are coupled to the exhaust passage to route exhaust gas from the engine to atmosphere (after it passes through an optional exhaust gas treatment system 130 and first and second turbochargers 120 and 124). The donor cylinders, which provide engine exhaust gas recirculation (EGR), are coupled exclusively to an EGR passage 162 of an EGR system 160 which routes exhaust gas from the donor cylinders to the intake passage of the engine, and not to atmosphere. By introducing cooled exhaust gas to the engine, the amount of available oxygen for combustion is decreased, thereby reducing combustion flame temperatures and reducing the formation of nitrogen oxides (e.g., $NO_x$).

Exhaust gas flowing from the donor cylinders to the intake passage passes through a heat exchanger such as an EGR cooler 166 to reduce a temperature of (e.g., cool) the exhaust gas before the exhaust gas returns to the intake passage. The EGR cooler may be an air-to-liquid heat exchanger, for example. In such an example, one or more charge air coolers 132 and 134 disposed in the intake passage (e.g., upstream of where the recirculated exhaust gas enters) may be adjusted to further increase cooling of the charge air such that a mixture temperature of charge air and exhaust gas is maintained at a desired temperature. In other examples, the EGR system may include an EGR cooler bypass. Alternatively, the EGR system may include an EGR cooler control element. The EGR cooler control element may be actuated such that the flow of exhaust gas through the EGR cooler is reduced; however, in such a configuration, exhaust gas that does not flow through the EGR cooler is directed to the exhaust passage rather than the intake passage.

Additionally, in some embodiments, the EGR system may include an EGR bypass passage 161 that is configured to divert exhaust from the donor cylinders back to the exhaust passage. The EGR bypass passage may be controlled via a first valve 163. The first valve may be configured with a plurality of restriction points such that a variable amount of exhaust is routed to the exhaust, in order to provide a variable amount of EGR to the intake.

In an alternate embodiment shown in FIG. 1, the donor cylinders may be coupled to an alternate EGR passage 165 (illustrated by the dashed lines) that is configured to selectively route exhaust to the intake or to the exhaust passage. For example, when a second valve 170 is open, exhaust may be routed from the donor cylinders to the EGR cooler and/or additional elements prior to being routed to the intake passage. Further, the alternate EGR system includes a third valve 164 disposed between the exhaust passage and the alternate EGR passage.

The third valve and second valve may be on/off valves controlled by the control unit 180 (for turning the flow of EGR on or off), or they may control a variable amount of EGR, for example. In some examples, the third valve may be actuated such that an EGR amount is reduced (exhaust gas flows from the alternate EGR passage to the exhaust passage). In other examples, the third valve may be actuated such that the EGR amount is increased (e.g., exhaust gas flows from the exhaust passage to the alternate EGR passage). In some embodiments, the alternate EGR system may include a plurality of EGR valves or other flow control elements to control the amount of EGR.

In such a configuration, the third valve 164 is operable to route exhaust from the donor cylinders to the exhaust passage of the engine and the second valve 170 is operable to route exhaust from the donor cylinders to the intake passage of the engine. As such, the third valve may be referred to as an EGR bypass valve, while the second valve may be referred to as an EGR metering valve. In the embodiment shown in FIG. 1, the third valve and the second valve may be engine oil, or hydraulically, actuated valves, for example, with a shuttle valve (not shown) to modulate the engine oil. In some examples, the valves may be actuated such that one of the third and second valves is normally open and the other is normally closed. In other examples, the third and second valves may be pneumatic valves, electric valves, or another suitable valve.

As shown in FIG. 1, the vehicle system further includes an EGR mixer 172 which mixes the recirculated exhaust gas with charge air such that the exhaust gas may be evenly distributed within the charge air and exhaust gas mixture. In the embodiment depicted in FIG. 1, the EGR system is a high-pressure EGR system which routes exhaust gas from a location upstream of the turbochargers in the exhaust passage to a location downstream of the turbochargers in the intake passage. In other embodiments, the vehicle system may additionally or alternatively include a low-pressure EGR system which routes exhaust gas from downstream of the turbochargers in the exhaust passage to a location upstream of the turbochargers in the intake passage.

As depicted in FIG. 1, the vehicle system may further include a two-stage turbocharger with the first turbocharger 120 and the second turbocharger 124 arranged in series, each of the turbochargers arranged between the intake passage and the exhaust passage. The two-stage turbocharger increases air charge of ambient air drawn into the intake passage in order to provide greater charge density during combustion to increase power output and/or engine-operating efficiency. The first turbocharger operates at a relatively lower pressure, and includes a first turbine 121 which drives a first compressor 122. The first turbine and the first compressor are mechanically coupled via a first shaft 123. The first turbocharger may be referred to the "low-pressure stage" of the turbocharger. The second turbocharger operates at a relatively higher pressure, and includes a second turbine 125 which drives a second compressor 126. The second turbocharger may be referred to the "high-pressure stage" of the turbocharger. The second turbine and the second compressor are mechanically coupled via a second shaft 127.

As explained above, the terms "high pressure" and "low pressure" are relative, meaning that "high" pressure is a pressure higher than a "low" pressure. Conversely, a "low" pressure is a pressure lower than a "high" pressure.

As used herein, "two-stage turbocharger" may generally refer to a multi-stage turbocharger configuration that includes two or more turbochargers. For example, a two-stage turbocharger may include a high-pressure turbocharger and a low-pressure turbocharger arranged in series, three turbocharger arranged in series, two low pressure turbochargers feeding a high pressure turbocharger, one low pressure turbocharger feeding two high pressure turbochargers, etc. In one example, three turbochargers are used in series. In another example, only two turbochargers are used in series.

In alternate embodiments, the engine system may only include a single stage turbocharger with only a single turbine and single compressor.

In the embodiment shown in FIG. 1, the second turbocharger is provided with a turbine bypass valve (TBV) 128 which allows exhaust gas to bypass the second turbocharger. The turbine bypass valve may be opened, for example, to divert the exhaust gas flow away from and around the second turbine. In this manner, the rotating speed of the second compressor, and thus the boost provided by the turbochargers to the engine may be regulated. For example, by increasing the opening of the TBV, the speed of the turbine and thus the compressor mechanically coupled with the turbine may decrease, thereby decreasing boost provided to the engine. Decreasing boost may decrease an intake manifold pressure (MAP) of the engine.

Additionally, the first turbocharger may also be provided with a turbine bypass valve. In other embodiments, only the first turbocharger may be provided with a turbine bypass valve, or only the second turbocharger may be provided with a turbine bypass valve. Additionally, the second turbocharger may be provided with a compressor bypass valve 129, which allows gas to bypass the second compressor 126 to avoid compressor surge, for example. In some embodiments, the first turbocharger may also be provided with a compressor bypass valve, while in other embodiments, only first turbocharger may be provided with a compressor bypass valve.

The vehicle system further includes the exhaust treatment system coupled in the exhaust passage in order to reduce regulated emissions. As depicted in FIG. 1, the exhaust gas treatment system is disposed downstream of the first turbine of the first (low pressure) turbocharger. In other embodiments, an exhaust gas treatment system may be additionally or alternatively disposed upstream of the first turbocharger. The exhaust gas treatment system may include one or more components. For example, the exhaust gas treatment system may include one or more of a diesel particulate filter (DPF), a diesel oxidation catalyst (DOC), a selective catalytic reduction (SCR) catalyst, a three-way catalyst, a $NO_x$ trap, and/or various other emission control devices or combinations thereof. In alternate embodiments, the vehicle system may not include the exhaust aftertreatment system.

The exhaust passage may further include an exhaust gas sensor 190. The exhaust gas sensor measures an exhaust emission value (e.g., level) of the exhaust gas. For example, the exhaust gas sensor may measure a content of the exhaust gas. In one example, the exhaust emission value may be an amount of oxygen and/or NOx in the exhaust gas. As such, the exhaust gas sensor may measure both an oxygen and NOx level of the exhaust gas flowing through the exhaust passage. In another example, the exhaust passage may include two exhaust gas sensors, a first measuring exhaust oxygen content and a second measuring exhaust NOx content. The exhaust gas sensor is shown positioned downstream from the turbochargers and upstream of the exhaust gas treatment system. However, in alternate embodiments the exhaust gas sensor may be positioned in alternate locations in the exhaust passage, such as upstream of the turbochargers or between the two turbocharger stages. The exhaust gas sensor may alternatively be positioned in orificed side-sample lines that bypass the one or more turbines. In one example, the exhaust gas sensor may be a universal exhaust gas oxygen sensor (UEGO) or another appropriate exhaust constituent sensor.

The vehicle system further includes the control unit 180, which is provided and configured to control various components related to the vehicle system. In one example, the control unit includes a computer control system (e.g., referred to herein as a controller). The control unit further includes non-transitory, computer readable storage media (not shown) including code for enabling on-board monitoring and control of engine operation. The control unit, while overseeing control and management of the vehicle system, may be configured to receive signals from a variety of engine sensors, as further elaborated herein, in order to determine operating parameters and operating conditions, and correspondingly adjust various engine actuators to control operation of the vehicle system. For example, the control unit may receive signals from various engine sensors including sensor 181 arranged in the inlet of the high-pressure turbine, sensor 182 arranged in the inlet of the low-pressure turbine, sensor 183 arranged in the inlet of the low-pressure compressor, sensor 184 arranged in the inlet of the high-pressure compressor, and the exhaust gas sensor. The sensors arranged in the inlets of the turbochargers may detect air temperature and/or pressure. In one example, a pressure difference across the TBV (and high pressure turbine) may be determined based on a difference between turbine inlet pressure (measured by sensor 181) and turbine outlet pressure (measure by sensor 182).

The second turbocharger may also include a speed sensor 191 for measuring turbine speed (e.g., high pressure turbine speed) of the second turbocharger and the first turbocharger may also include a speed sensor 193 for measuring turbine speed of the first turbocharger. It should be noted that turbine speed and turbocharger speed may be used interchangeably throughout the disclosure, as the turbocharger turbine drives the turbocharger compressor. In alternate embodiments, only one of the first or second turbocharger may include a turbocharger (e.g., turbine) speed sensor. In yet another embodiment, if the engine system only includes a single turbocharger, the single turbocharger may include the turbocharger speed sensor. As explained further below, the controller may determine a time-varying speed of the turbocharger based on an output of the turbocharger speed sensor. The controller may not apply a filter to the time-varying speed output by the turbocharger sensor that results in an average speed of the turbocharger. As a result, the turbocharger speed fluctuations corresponding to each exhaust pulse received at the turbine from each cylinder may be preserved and analyzed, as described further below. However, in some embodiments, the controller may apply a notch filter to the output of the turbocharger speed sensor in order to remove the firing frequency (and higher harmonics if necessary) of the engine.

In some embodiments, the engine may include a sensor for measuring peak cylinder pressure. Additional sensors may include, but are not limited to, engine speed, engine load, boost pressure, ambient pressure, exhaust temperature, exhaust pressure, etc. Correspondingly, the control unit may control the vehicle system by sending commands to various components such as traction motors, alternator, cylinder valves, throttle, heat exchangers, wastegates or other valves or flow control elements, etc. For example, the controller may send commands to an actuator of a fuel injector or exhaust valve of an individual cylinder, thereby adjusting operation of the individual cylinder based on the received command.

FIG. 2 depicts an embodiment of a combustion chamber, or cylinder 200, of a multi-cylinder internal combustion engine, such as the engine described above with reference to FIG. 1. For example, the cylinder may be any one of the cylinders from the subset of non-donor cylinders 105 or the subset of donor cylinders. The cylinder may be defined by a cylinder head 201, housing the intake and exhaust valves and liquid fuel injector, described below, and a cylinder block 203.

The engine may be controlled at least partially by a control system including controller 180 which may be in further communication with a vehicle system, such as the locomotive described above with reference to FIG. 1. As described above, the controller may further receive signals from various engine sensors including, but not limited to, engine speed, engine load, boost pressure, exhaust pressure, turbocharger speed, ambient pressure, CO2 levels, exhaust temperature, NOx emission, engine coolant temperature (ECT) from temperature sensor 230 coupled to cooling sleeve 228, etc. Correspondingly, the controller may control the vehicle system by sending commands to various components such as alternator, cylinder valves, throttle, fuel injectors, etc.

The cylinder (i.e., combustion chamber) may include cylinder liner 204 with a piston 206 positioned therein. The piston may be coupled to a crankshaft 208 so that reciprocating motion of the piston is translated into rotational motion of the crankshaft. The crankshaft may include a crankshaft speed sensor for outputting a speed (e.g., instantaneous speed) of the crankshaft. In some embodiments, the engine may be a four-stroke engine in which each of the cylinders fires in a firing order during two revolutions of the crankshaft. In other embodiments, the engine may be a two-stroke engine in which each of the cylinders fires in a firing order during one revolution of the crankshaft.

The cylinder receives intake air for combustion from an intake including an intake passage 210. The intake passage receives intake air via an intake manifold. The intake passage may communicate with other cylinders of the engine in addition to the cylinder, for example, or the intake passage may communicate exclusively with the cylinder.

Exhaust gas resulting from combustion in the engine is supplied to an exhaust including an exhaust passage 212. Exhaust gas flows through the exhaust passage, to a turbocharger in some embodiments (not shown in FIG. 2) and to atmosphere, via an exhaust manifold. The exhaust passage may further receive exhaust gases from other cylinders of the engine in addition to the cylinder, for example.

Each cylinder of the engine may include one or more intake valves and one or more exhaust valves. For example, the cylinder is shown including at least one intake poppet valve 214 and at least one exhaust poppet valve 216 located in an upper region of cylinder. In some embodiments, each cylinder of the engine, including the cylinder, may include at least two intake poppet valves and at least two exhaust poppet valves located at the cylinder head.

The intake valve may be controlled by the controller via an actuator 218. Similarly, the exhaust valve may be controlled by the controller via an actuator 220. During some conditions, the controller may vary the signals provided to the actuators to control the opening and closing of the respective intake and exhaust valves. The position of the intake valve and the exhaust valve may be determined by respective valve position sensors 222 and 224, respectively, and/or by cam position sensors. The valve actuators may be of the electric valve actuation type or cam actuation type, or a combination thereof, for example.

The intake and exhaust valve timing may be controlled concurrently or any of a possibility of variable intake cam timing, variable exhaust cam timing, dual independent variable cam timing or fixed cam timing may be used. In other embodiments, the intake and exhaust valves may be controlled by a common valve actuator or actuation system, or a variable valve timing actuator or actuation system. Further, the intake and exhaust valves may by controlled to have variable lift by the controller based on operating conditions.

In still further embodiments, a mechanical cam lobe may be used to open and close the intake and exhaust valves. Additionally, while a four-stroke engine is described above, in some embodiments a two-stroke engine may be used, where the intake valves are dispensed with and ports in the cylinder wall are present to allow intake air to enter the cylinder as the piston moves to open the ports. This can also extend to the exhaust, although in some examples exhaust valves may be used.

In some embodiments, each cylinder of the engine may be configured with one or more fuel injectors for providing fuel thereto. As a non-limiting example, FIG. 2 shows the cylinder including a fuel injector 226. The fuel injector is shown coupled directly to the cylinder for injecting fuel directly therein. In this manner, the fuel injector provides what is known as direct injection of a fuel into the combustion cylinder. The fuel may be delivered to the fuel injector from a first, liquid fuel system 232, which may include a fuel tank, fuel pumps, and a fuel rail. In one example, the fuel is diesel fuel that is combusted in the engine through compression ignition. In other non-limiting embodiments, the fuel may be gasoline, kerosene, biodiesel, or other petroleum distillates of similar density through compression ignition (and/or spark ignition). In one example, the controller may control an amount, duration, timing, and spray pattern of fuel delivered to the cylinder via the fuel injector. As explained further below, fueling to the cylinder may be controlled by the controller actuating the fuel injector based on turbocharger speed fluctuations.

Further, each cylinder of the engine may be configured to receive gaseous fuel (e.g., natural gas) alternative to or in addition to diesel fuel. The gaseous fuel may be provided to the cylinder via the intake manifold. As shown in FIG. 2, the intake passage may receive a supply of gaseous fuel from a second, gaseous fuel system 234, via one or more gaseous fuel lines, pumps, pressure regulators, etc., located upstream of the cylinder. In some embodiments, the gaseous fuel system may be located remotely from the engine, such as on a different vehicle (e.g., on a fuel tender car), and the gaseous fuel may be supplied to the engine via one or more fuel lines that traverse the separate vehicles. However, in other embodiments the gaseous fuel system may be located on the same vehicle as the engine.

A plurality of gas admission valves, such as gas admission valve 236, may be configured to supply gaseous fuel from the gaseous fuel system to each respective cylinder via respective intake passages. For example, a degree and/or duration of opening of the gas admission valve may be adjusted to regulate an amount of gaseous fuel provided to the cylinder. As such, each respective cylinder may be provided with gaseous fuel from an individual gas admission valve, allowing for individual cylinder control in the amount of gaseous fuel provided to the cylinders. However, in some embodiments, a single-point fumigation system may be used, where gaseous fuel is mixed with intake air at a single point upstream of the cylinders. In such a configuration, each cylinder may be provided with substantially similar amounts of gaseous fuel. To regulate the amount of gaseous fuel provided by the single-point fumigation system, in some examples a gaseous fuel control valve may be positioned at a junction between a gaseous fuel supply line and the engine intake air supply line or intake manifold. The gaseous fuel control valve degree and/or duration of opening may be adjusted to regulate the amount of gaseous fuel admitted to the cylinders. In other examples, the amount of gaseous fuel admitted to the cylinders in the single-point fumigation system may be regulated by another mechanism, such as control of a gaseous fuel regulator, via control of a gaseous fuel pump, etc.

As introduced above, the engine system may include one or more turbochargers. Turbochargers are powered by exhaust energy flowing from individual cylinders of the engine to the turbine of the turbocharger. Thus, turbocharger speed is a function of the amount of exhaust energy the turbine receives from the engine cylinders. As the power output of the engine increases, so does the exhaust energy delivered to the turbine, and thus the turbocharger speed increases. The total energy delivered to the turbocharger is the sum of the energy delivered by the individual cylinders. However, this exhaust energy is not delivered as a continuous steady flow, but rather, as pulses of energy due to the synchronous timing in which each cylinder of the engine fires and the opening of the corresponding exhaust valves of each cylinder.

For example, as shown in graph 300 of FIG. 3, the turbocharger speed of a turbocharger (e.g., one of the first and second turbochargers 120 and 124 shown in FIG. 1) fluctuates over time. The speed may be measured in terms of RPMs, for example. Graph 300 shows the instantaneous turbocharger speed of a turbocharger over time, as measured by a turbocharger speed sensor coupled to the turbocharger. As shown in graph 300, the turbocharger speed instantaneously increases when an exhaust energy pulse (e.g., exhaust gases) of an individual cylinder arrives at the turbine of the turbocharger. Then, as the exhaust gasses from the individual cylinder pass through the turbine, the energy to the turbocharger subsides, thereby resulting in an instantaneous decrease in turbocharger speed. For one exhaust energy pulse 301 received at the turbine (referred to herein as a turbocharger speed fluctuation), corresponding to an individual cylinder, the pulse has a peak 302 where the exhaust energy from the individual cylinder passes through the turbine and a valley 304 when the exhaust gasses from the individual cylinder have passed through the turbine (and before the next exhaust energy pulse from a next individual cylinder in the firing order). The distance between the peak 302 and valley 304 is an amplitude 306 of the exhaust energy pulse from the individual cylinder. The amplitude of the exhaust energy pulse may be referred to herein as the magnitude of the instantaneous turbocharger speed fluctuation for the corresponding individual cylinder. Thus, just as the average speed of the turbocharger is a function of the total exhaust energy, the magnitude of the instantaneous speed fluctuation is a function of the exhaust energy pulses from the individual cylinder. Traditionally, the turbocharger speed fluctuations may be filtered by typical speed measurement systems. As such, the magnitude of the turbocharger speed fluctuations is typically unknown. However, an engine controller may employ high speed signal processing methods so that the magnitude and timing of these instantaneous speed fluctuations may be monitored and synchronized with the crankshaft position (e.g., crankshaft angle) so that the cylinder source of the energy pulse may be determined. For example, as shown in graph 308, the turbocharger speed fluctuations of the turbocharger may be correlated to the crankshaft position by plotting the amplitude of the turbocharger speed fluctuations (e.g., revolutions per minute) vs. crankshaft angle (e.g., degrees). As such, each energy pulse and amplitude of each energy pulse may be correlated to the crankshaft position. From this information, based on a known firing order of the cylinders of the engine, the controller may determine which instantaneous turbocharger speed fluctuation (e.g., energy pulse) corresponds to which cylinder. In this way, crankshaft position is correlated with the firing of a particular cylinder and the particular cylinder is connected to a corresponding instantaneous turbocharger speed fluctuation. Thus, a timing and magnitude of each instantaneous turbocharger speed fluctuation for each cylinder may be determined and compared to other cylinders and/or target values based on engine operation. As used herein and described further below, an instantaneous turbocharger speed fluctuation refers to the increase and subsequent decrease in turbocharger speed at a moment in time due to an energy pulse from an individual engine cylinder being received at the turbine, such as the instantaneous turbocharger speed fluctuation 301 shown in FIG. 3.

Turning to FIG. 4, a flow chart showing a method 400 for determining an operating parameter of individual cylinders of an engine (e.g., such as the engine 104 shown in FIGS. 1-2) is disclosed. In particular, method 400 is a method for determining when to diagnose individual cylinders of the engine and adjust engine operation based on the individual cylinder diagnosis. Instructions for carrying out method 400 and the rest of the methods described herein may be stored in a memory of the controller (e.g., electronic engine controller) and executed by a processor of the controller. Specifically, the controller may execute the methods described herein according to the stored instructions in combination with various sensors (e.g., turbocharger speed sensor) and actuators (e.g., fuel injectors, exhaust valves, or the like) of the engine.

Method 400 begins at 402 by estimating and/or measuring engine operating conditions. Engine operating conditions include engine speed, engine notch level (e.g., engine load), mass air flow to the engine, engine temperature, exhaust air-fuel ratio, turbocharger speed, crankshaft speed, injection timing, or the like. At 404, the method includes determining if the turbocharger is in a surge state. For example, the surge state may include the turbocharger actively surging or a prediction that the turbocharger is expected to enter a surge state if engine operation is maintained. Turbocharger surge may be based on one or more conditions of the turbocharger including a gas flow rate through a compressor and a pressure across the compressor. If the compressor is surging or is expected to enter a surge state, the method continues to 406 to not diagnose the engine cylinders based on turbocharger speed. Thus, the method at 406 may include not determining operating conditions of the individual cylinders based on turbocharger speed fluctuations and instead maintaining engine operation. The method at 406 may also include diagnosing and determining operation parameters of the engine cylinders using another method (e.g., such as based on crankshaft speed fluctuations).

Alternatively at 404, if the compressor is not in a surge state and compressor surge is not expected, the method continues to 408 to diagnose the engine cylinders that exclusively provide exhaust gas to an exhaust passage including the turbine of the turbocharger. For example, these cylinders may include non-donor cylinders of the engine which always flow exhaust gas to the turbocharger turbine and do not provide exhaust gas to the intake of the engine. Diagnosing the non-donor engine cylinders may include determining one or more conditions (e.g., operating parameters) of individual non-donor cylinders based on turbocharger speed fluctuations of the turbocharger. Additionally, diagnosing the non-donor cylinders may include determining a magnitude and timing of a turbocharger speed fluctuation corresponding to each of the individual non-donor cylinders. A method for diagnosing the non-donor cylinders based on turbocharger speed fluctuations is presented at FIG. 5 and described in further detail below.

The method continues to 410 to determine if exhaust is flowing from the donor cylinders (e.g., cylinders adapted to provide EGR to an intake passage of the engine) to the turbocharger turbine. For example, the controller may determine a position of one or more EGR valves that control a flow of exhaust gas from the donor cylinders to the exhaust passage of the engine (e.g., one of valves 163 or 164 shown in FIG. 1). If the one or more EGR valves are closed such that no exhaust is flowing from the exhaust manifold of the donor cylinders to the turbine of the turbocharger, then the method continues to 412 to not diagnose the donor cylinders based on turbocharger speed fluctuations. The method at 412 may include determining operating conditions of the individual cylinders based on alternate methods (e.g., based on speed fluctuations of a crankshaft) or maintaining engine operation while the one or more EGR valves are closed and not flowing exhaust to the exhaust passage. Alternatively, if at least some exhaust is flowing from the donor cylinders to the turbine, then the method continues to 414 to diagnose the donor cylinders based on the turbocharger speed fluctuations of the turbocharger, the crankshaft position, and the position of the one or more EGR valves adapted to selectively provide exhaust to the exhaust passage containing the turbine from the donor cylinders. The method for individually diagnosing the donor cylinders, including determining one or more operating parameters of the individual donor cylinders, is discussed further below with reference to FIG. 5. Thus, after determining a magnitude and timing of a turbocharger speed fluctuation for an individual donor cylinder during method 500, the method at 414 may further include adjusting the determined magnitude of the turbocharger speed fluctuation based on what percentage of the exhaust gases from the respective individual cylinder is flowing to the exhaust passage. For example, if one of the EGR valves is partially open so that 50% of the exhaust gases from a single donor cylinder are flowing to the turbine, the determine magnitude of the corresponding turbocharger speed fluctuation may be increased by a proportional percentage (e.g., 50%) in order to accurately diagnose performance of the individual cylinder. In this way, cylinders that only partially flow exhaust to the turbine may still be diagnosed and operation of these individual cylinders may be adjusted based on the adjusted magnitude of the corresponding turbocharger speed fluctuation.

At 416, the method includes determining if a turbine bypass valve (e.g., such as turbine bypass valve 128 shown in FIG. 1) around the turbine of the turbocharger including the turbocharger speed sensor (for determining turbocharger speed fluctuations) is open (e.g., at least partially open). When a turbocharger includes a turbine bypass valve, some exhaust gas may bypass the turbine, thereby decreasing the turbocharger speed output by a turbocharger speed sensor of the turbocharger. This may reduce an amplitude of instantaneous turbocharger speed fluctuations and cause an inaccurate diagnosis of the individual engine cylinders. Thus, if the turbine bypass valve is open or at least partially open (e.g., not fully closed), then the method continues to 420 to adjust the determined operating conditions of the individual cylinders, as determined at 408 and 414 and by the method presented at FIG. 5, and then adjust engine operation (e.g., cylinder operation) based on the adjusted individual cylinder operating conditions. The method at 420 may further include adjusting the magnitude of the turbocharger speed fluctuation of each cylinder based on the percentage opening of the turbine bypass valve and then adjusting operation of the individual cylinder based on the corresponding adjusted magnitude of the turbocharger speed fluctuation. For example, if the turbine bypass valve is open by 40% (e.g., such that 40% of the exhaust gas from the engine cylinders bypasses the turbine), the controller may increase the magnitude of the turbocharger speed fluctuations by a percentage that corresponds to the percentage opening of the turbine bypass valve (e.g., 40%).

In this way, the turbocharger speed fluctuations may be adjusted based on a position of the turbine bypass valve and then the operating parameters of the individual cylinders may be determined based on the adjusted turbocharger speed fluctuations. Alternatively, if the turbine bypass valve is fully closed, or the turbocharger does not include a turbine bypass valve, the method continues to 418 to adjust engine operation based on determined operating conditions of the individual cylinders based on the turbocharger speed fluctuations. The method at 418 is described in further detail below with reference to FIG. 5.

FIG. 5 shows a method 500 for determining an operating parameter of an individual cylinder based on turbocharger speed fluctuations of a turbocharger and then adjusting engine operation based on the determined operating parameters. Method 500 may be included as part of the methods presented at 408, 414, 418, and 420 of FIG. 4.

At 502, the method includes correlating instantaneous turbocharger speed fluctuations of a turbocharger with a crankshaft position. Specifically, the method at 502 includes obtaining a time-varying output from a turbocharger speed senor. An example of an output of a turbocharger speed sensor is shown in graph 300. The output of the turbocharger speed sensor includes instantaneous turbocharger speed fluctuations of the turbocharger when the turbocharger speed increases and decreases from a baseline or average value. As used herein, instantaneous turbocharger speed fluctuations may refer to the increase or decrease in turbocharger speed at a specific time point. Thus, the instantaneous turbocharger speed fluctuations may be represented in a pulse, or deviation, in turbocharger speed from an average value over time. The time-varying output of the turbocharger speed sensor which includes the turbocharger speed fluctuations is then correlated with crankshaft position. For example, as shown in graph 308, the amplitude of each speed fluctuation for a specific time point is correlated to the crankshaft position (e.g., crankshaft angle) at the same moment in time that the specific turbocharger speed fluctuation occurs. The crankshaft position is also correlated with the cylinder firing order of the engine to determine which individual cylinder provides exhaust to the turbine at each crankshaft position. For example, each cylinder may correspond to a different one of the turbocharger speed fluctuations and a controller may determine which fluctuation corresponds to which cylinder based on the crankshaft position and cylinder firing order. The method at 502 may include applying signal processing techniques to analyze the time-varying signal of the turbocharger speed sensor. For example, the controller may apply a notch filter that filters out the firing frequency of the engine but preserves the speed fluctuations corresponding to each engine cylinders.

The method continues on to 504 to determine the magnitude and timing of each turbocharger speed fluctuation for each corresponding cylinder. Thus, for each cylinder, the controller may determine the timing and magnitude of the associated turbocharger speed fluctuation. For example, the method at 504 may include identifying the turbocharger speed fluctuation corresponding to a specific cylinder and then determining the amplitude of the identified turbocharger speed fluctuation. The amplitude is the magnitude of that turbocharger speed fluctuation. The crankshaft position (e.g., angle) that the turbocharger speed fluctuation occurs is then used as the timing for the specific cylinder. The method at 504 may further include determining an average magnitude of the turbocharger speed fluctuations for all the engine cylinders over a period of time (e.g., a mean value or baseline value for a period of data acquisition of the time-varying turbocharger speed).

At 506, the method includes determining if the magnitude or timing of the instantaneous turbocharger speed fluctuation an individual engine cylinder is outside of a threshold range. The controller may determine this for each individual engine cylinder. As one example, a first threshold range for the magnitude of the instantaneous speed fluctuation for an individual cylinder may be based on the average magnitude of the instantaneous turbocharger speed fluctuations for all cylinders of the engine. In another example, the first threshold range may be further based on operation of the individual cylinders. Thus, the first threshold range may be different for different cylinders. As another example, a second threshold range for the timing of the instantaneous speed fluctuation for an individual cylinder may be based on the crankshaft position during the instantaneous speed fluctuation of the turbocharger corresponding to the individual cylinder. For example, the turbocharger speed fluctuation of a first cylinder may be expected to occur at first crankshaft position based on the cylinder firing order. If the turbocharger speed fluctuation of the first cylinder occurs a threshold amount before or after the first crankshaft positon, then the timing of the turbocharger speed fluctuation for the first cylinder may be outside of the second threshold range.

If the magnitude or timing of the turbocharger speed fluctuation for an individual cylinder is not outside of threshold ranges, then the method continues to 508 to continue current engine operation and not indicate a fault of the individual cylinder. For example, a fault of the individual cylinder may refer to a fueling, exhaust valve timing, or other similar condition of the individual cylinder that may result in an adjustment to the fueling, exhaust valve timing, or other similar condition. Alternatively at 506, if the magnitude or timing of the turbocharger speed fluctuation for an individual cylinder is outside of threshold ranges, the method continues to 510 to indicate an operating parameter of the individual cylinder. The indicated operating parameter may include one or more of engine misfire, engine knock, a total fueling amount that is above or below a threshold value range, a fueling ratio between a first and second fuel in a multi-fuel engine system, degradation of the individual cylinder, degradation of a fuel injector that is configured to supply fuel to the individual engine cylinder, and/or degradation of an exhaust valve of the individual engine cylinder. In this way, the method at 510 may include determining one or more operating parameters of the individual cylinder based on the magnitude and timing of the corresponding turbocharger speed fluctuation. The method at 510 may further include determining one or more faults (e.g., anomalous conditions) of the individual cylinder when the determined operating parameters are outside of threshold ranges. For example, the controller may compare the average magnitude of the turbocharger speed fluctuations to the magnitude for the identified cylinder. The controller may then determine a percent or amount of deviation from a mean magnitude value of all the cylinders for each individual cylinder. If the exhaust energy delivered to the turbocharger from one cylinder is deviant from the other cylinders, this deviation will manifest itself as a deviation of the magnitude and/or timing of the instantaneous speed fluctuation of the turbocharger. Thus, by determining how much a magnitude of the instantaneous speed fluctuation of the turbocharger for each cylinder deviates from an average value, individual cylinders may be diagnosed and indicated as needing operational adjustments to move them back into an operational range more consistent with the remaining cylinders. For example, if one cylinder in the engine is misfiring or not receiving as much fuel as the other cylinders, the exhaust energy from that cylinder will be lower, thereby resulting in a decreased magnitude in the instantaneous turbocharge speed compared to other cylinders (or the average magnitude). In another example, a degraded (e.g., leaky) exhaust valve may result in the instantaneous turbocharger speed fluctuation (e.g., exhaust pulse) for the corresponding cylinder being out of phase from what is expected of the cylinder (e.g., based on the crankshaft position and firing order of the engine) and the instantaneous turbocharger speed fluctuation may be reduced at the expected timing.

In one embodiment, the method at 510 may include indicating that an operating condition of the identified cylinder needs to be adjusted based on the magnitude and/or timing of the instantaneous turbocharger speed fluctuation being outside of a first threshold range. The method may further include indicating degradation of the identified cylinder, or components coupled to the cylinder, in response to the magnitude and/or timing of the instantaneous turbocharger speed fluctuation being outside of a second threshold range, where the second threshold range is greater than the first threshold range. A method for determining a specific type of degradation based on the magnitude and/or timing of the instantaneous turbocharger speed fluctuation is presented at FIG. 6, described further below.

The method at 510 may be performed for each individual engine cylinder that had a magnitude or timing of the corresponding turbocharger speed fluctuation outside of the threshold ranges. In another embodiment, the method at 510 may include indicating a fault or operating condition of a cluster of engine cylinders (e.g., a grouping of more than one engine cylinder) that fire adjacent to each other.

At 512, the method may optionally include confirming cylinder degradation with crankshaft speed fluctuations. For example, an instantaneous speed fluctuation of a crankshaft may be determined based on an output of a crankshaft speed sensor and the crankshaft position. If the instantaneous speed fluctuation of the crankshaft for the identified cylinder is also outside of an expected range for the crankshaft speed fluctuations, the method at 512 may include confirming degradation and notifying a vehicle operator that the individual engine cylinder (or one or more components coupled to the cylinder, such as a fuel injector of exhaust valve) is degraded. This may include activating a light indicator, activating an audible warning signal, or displaying a digital message to an operator of the engine. In another embodiment, indication of cylinder degradation may be performed at 510 or 514.

At 514, the method includes adjusting engine operation (or individual cylinder operation of the identified cylinder) based on the determined operation parameters of the identified cylinder. A method for adjusting individual cylinder operation based on which of the magnitude and/or timing of the instantaneous turbocharger speed fluctuation is outside of threshold ranges is presented at FIG. 6 and described further below. In this way, the controller may determine what engine adjustment is needed based on whether the magnitude or timing of the instantaneous turbocharger speed fluctuation deviates from a threshold value or value ranges for the individual cylinder.

After making the determined adjustments to engine operation, the method ends. However, the controller may continuously execute methods 500 and 600, and if the magnitude and/or timing of the instantaneous turbocharge speed fluctuation for the individual cylinder is not back within the threshold ranges, the method may again adjust engine operation to move the individual cylinder operation back into the desired range.

FIG. 6 shows a method 600 for adjusting engine operation based on the magnitude and/or timing of the instantaneous turbocharger speed fluctuation for an individual cylinder. The controller may execute method 600 for each individual cylinder of the engine. Thus, operation of each individual cylinder may be adjusted based on the determined magnitude and timing of the instantaneous turbocharger speed fluctuation for the individual cylinder. Method 600 may continue from and be part of the method at 514 in method 500. As such, method 600 may begin at 602 by determining a magnitude and timing of an instantaneous turbocharger speed fluctuation of an individual cylinder. The magnitude and timing for each engine cylinder are determined during method 500 shown in FIG. 5.

At 604 the method includes determining if only the magnitude (and not the timing) of the turbocharger speed fluctuation of the individual cylinder is outside of its corresponding threshold (e.g., expected) range. As explained above, the threshold range for the magnitude may be a first threshold range which may be determined based on an average magnitude of the instantaneous turbocharge speed fluctuations of the turbocharger for all cylinders of the engine. The first threshold range may be further based on engine operation, such as engine load. If only the magnitude of the turbocharger speed fluctuation of the individual cylinder is outside of its threshold range, then the method continues to 606 to adjust fueling to the individual cylinder and/or indicate cylinder degradation. Adjusting fueling to the individual cylinder may include adjusting a total fueling amount that is delivered to the individual cylinder and/or adjusting a fueling ratio between a first and second fuel in a multi-fuel engine. For example, if the multi-fuel engine combusts both gaseous and liquid fuel (e.g., diesel fuel), the controller may adjust a substitution ratio of gaseous fuel to diesel fuel. In one example, if the magnitude of the instantaneous turbocharger speed fluctuation of the individual cylinder is less than a lower threshold of the first threshold range, the controller may increase the amount of fuel delivered to the individual cylinder by actuating one or more of a fuel injector and a gaseous fueling valve to inject an increased amount of fuel into the individual cylinder. Thus, the method at 606 may include increasing fueling to the individual cylinder for which the magnitude of the instantaneous turbocharger speed fluctuation is less than the threshold range while maintaining fueling to the remaining cylinders of the engine (unless method 600 determines that operation of one or more of the remaining engine cylinders needs to be adjusted based on the corresponding turbocharger speed fluctuation). The amount of adjustment to the fueling (e.g., the amount of increase or decrease in fueling delivered to the cylinder) may increase as the deviation of the magnitude of the instantaneous turbocharger speed fluctuation for the individual cylinder increases from the threshold range. In another example, if the magnitude of the instantaneous turbocharger speed fluctuation of the individual cylinder is outside of a second threshold range, the second threshold range greater than the first threshold range, the method at 606 may include indicating degradation of the cylinder and/or fuel injector configured to provide fuel to the cylinder. Indicating degradation may include alerting a vehicle operator via displaying a light or warning icon and/or actuating an audible warning. The indication of degradation may include an indication that the cylinder and/or fuel injector requires service or replacement. Further, the indicating degradation may include setting a diagnostic flag within the controller.

Alternatively at 604, if only the magnitude of the instantaneous turbocharger speed fluctuation of the individual cylinder is not outside of its corresponding threshold range, the method continues to 608 to determine if only the timing of the instantaneous turbocharger speed fluctuation of the individual cylinder is outside of its corresponding threshold range. The threshold range for the timing may be a third threshold range which may be determined based on an expected crankshaft position based on the cylinder firing order of the engine and the instantaneous turbocharger speed fluctuation correlated to crankshaft position. For example, if the instantaneous turbocharger speed fluctuation of the individual cylinder occurs at a first crankshaft position (e.g., angle) that is a threshold amount before an expected, second crankshaft position (based on the firing frequency), then the controller may determine that the timing of the instantaneous turbocharger speed fluctuation of the individual cylinder is outside of the threshold range. Thus, the method continues on to 610 to adjust valve timing (e.g., exhaust valve timing) and/or indicate degradation of the exhaust valve of the individual cylinder based on the determined timing of the instantaneous turbocharger speed fluctuation for the individual cylinder. Similar to the method of 606, the controller may first adjust exhaust valve timing of the individual cylinder in response to the timing of the instantaneous turbocharger speed fluctuation of the individual cylinder being outside of the third threshold range. The controller may indicate degradation of one or more exhaust valves of the individual cylinder in response to the timing of the instantaneous turbocharger speed fluctuation of the individual cylinder being outside of a fourth threshold range, the fourth threshold range greater than the third threshold range. In another example, the controller may adjust exhaust valve timing and indicate degradation of the exhaust valve at 610.

Alternatively at 608, if only the timing of the instantaneous turbocharger speed fluctuation of the individual cylinder is not outside of its corresponding threshold range, the method continues to 612 to determine if both the magnitude and the timing of the instantaneous turbocharger speed fluctuation of the individual cylinder are outside of their corresponding threshold ranges. If the magnitude and timing are both confirmed to be outside of their threshold ranges (e.g., the first and third threshold ranges described above), then the method continues to 614 to adjust one or more of fueling to the individual cylinder, exhaust valve timing of the individual cylinder, and/or indicate cylinder degradation of the individual cylinder. The method may also include indicating degradation of the exhaust valve and/or fuel injector of the individual cylinder. For example, the method at 614 may include adjusting both exhaust valve timing and fueling of the individual cylinder. The type and amount of adjustments at 614 may be based on the determined magnitude and timings of the instantaneous turbocharger speed fluctuation of the individual cylinder and how much these deviate from the threshold ranges. Further, the method at 614 may include adjusting one of the exhaust valve timing or fueling first and then adjusting the other of the exhaust valve timing or fueling. The order of adjustment may be based on which of the magnitude or timing are further outside of the respective threshold range. If both the magnitude and timing of the instantaneous turbocharger speed fluctuation of the individual cylinder are not outside of their respective threshold ranges, the method continues to 616 to maintain current operation of the individual cylinder.

In this way, method 600 may individually adjust operation of the engine cylinders based on the magnitude and/or timing of the instantaneous turbocharger speed fluctuation for each cylinder. The type of adjustment to the individual cylinder is based on which of the magnitude or timing of the instantaneous turbocharger speed fluctuation are outside of the threshold ranges and how far these values are outside of their threshold ranges. Method 600 may be executed for each individual cylinder when the conditions for diagnosing the individual cylinder are met, as determined in method 400 presented in FIG. 4. Thus, under certain conditions (e.g., when exhaust gas from a subset of cylinders is not flowing to the turbine), only some of the engine cylinders may be diagnosed using the methods of FIGS. 5-6 while others of the engine cylinders are not diagnosed using the turbocharger speed fluctuations.

As another embodiment, the magnitude of the turbocharger speed fluctuation associated with the expected exhaust flow pulse for a given set of conditions may be used to assess the health of the turbocharger. As an example, if a less than expected or less than typical instantaneous speed increase is experienced for a given set of conditions, this information may be used to diagnose a turbocharger or other anomaly.

The technical effect of adjusting engine operation based on an indicated operating parameter of an individual cylinder, where the indicated operating parameter is based on at least one turbocharger speed fluctuation of a turbocharger correlated with crankshaft position is more accurately assessing function of the individual cylinder and making adjustments to operation of the individual cylinder. As such, operation of individual cylinders may be adjusted, thereby increasing engine efficiency and increasing fuel economy. Adjusting operation of individual cylinders based on the turbocharger speed fluctuations of the turbocharger involves assessing a time-varying output of a sensor already present in the engine system (e.g., the turbocharger speed sensor).

Thus, specialized components, personnel, or additional costly sensors are not required for individual cylinder diagnoses. This reduces engine operation costs and makes it easier to make a determination of engine cylinder health. Further, this method for assessing individual cylinder operation may work in a plurality of engine having a smaller number of cylinders (e.g., 4) or a larger number of cylinders (e.g., 12 or 24).

As one embodiment, a method for an engine comprises adjusting engine operation based on an indicated operating parameter of an individual engine cylinder, where the indicated operating parameter is based on at least one turbocharger speed fluctuation of a turbocharger correlated with crankshaft position. The indicated operating parameter may include one or more of engine misfire, engine knock, total fueling amount that is above or below a threshold value range, fueling ratio between a first and second fuel in a multi-fuel system, degradation of the individual engine cylinder, degradation of a fuel injector that is configured to supply fuel to the individual engine cylinder, and degradation of an exhaust valve of the individual engine cylinder.

As one example, the turbocharger speed fluctuation of the turbocharger is an instantaneous turbocharger speed fluctuation of the turbocharger and the method may further comprise determining a magnitude and timing of the instantaneous turbocharger speed fluctuation for the individual engine cylinder and determining the indicated operating parameter of the individual engine cylinder based on one or more of the determined magnitude and the timing being outside of a corresponding one or more determined threshold ranges. For example, the threshold ranges may be based at least in part on an average magnitude of the instantaneous turbocharger speed fluctuation for each and every engine cylinder and the crankshaft position. Additionally, the method may comprise synchronizing the instantaneous turbocharger speed fluctuation to the crankshaft position and determining the individual cylinder that corresponds to the instantaneous turbocharger speed fluctuation based on a cylinder firing order of the engine. As one example, adjusting engine operation includes adjusting fueling to the individual engine cylinder in response to the magnitude of the instantaneous turbocharger speed fluctuation for the individual engine cylinder being outside of a first threshold range. Additionally or alternatively, the method may further comprise indicating degradation of the individual engine cylinder in response to the magnitude of the instantaneous turbocharger speed fluctuation for the individual engine cylinder being outside of a second threshold range, the second threshold range greater than the first threshold range. In another example, adjusting engine operation includes one or more of adjusting valve timing and indicating degradation of an exhaust valve of the individual engine cylinder in response to the timing of the instantaneous turbocharger speed fluctuation for the individual engine cylinder being outside of a third threshold range.

The method may further comprise confirming the indicated operating parameter based on instantaneous speed fluctuations of a crankshaft. As another example, the turbocharger speed fluctuation of the turbocharger is determined from a time-varying output of a turbocharger speed sensor and the method may further comprise adjusting the turbocharger speed fluctuation based on a position of a turbine bypass valve positioned in a bypass passage around a turbine of the turbocharger. In another example, the method may further comprise determining if the turbocharger is in a surge state, and if not in a surge state then diagnosing one or more individual engine cylinders, and adjusting engine operation based on the indicated operating parameter of the resulting diagnosis. Further, the method may comprise determining that exhaust from a plurality of donor cylinders is flowing to a turbine of the turbocharger, where the plurality of donor cylinders are collectively configured to route exhaust gas to an exhaust passage and therethrough to an intake passage to an air supply for the engine, and if so then diagnosing one or more individual donor cylinders that are part of the plurality of donor cylinders.

As another embodiment, a method for an engine comprises adjusting operation of an individual engine cylinder in response to one or both of a sensed magnitude and timing of a sensed speed fluctuation of a turbocharger, in which the sensed speed fluctuation corresponds to the individual engine cylinder and is determined to be outside of a corresponding determined range, where the sensed magnitude and timing of the sensed speed fluctuation of the turbocharger is based at least in part on an output of a turbocharger speed sensor and a crankshaft position. In one example, a first determined range of the magnitude of the sensed speed fluctuation of the turbocharger for the individual engine cylinder is based on an average magnitude of the sensed speed fluctuation of the turbocharger for all cylinders of the engine and a second determined range of the timing of the sensed speed fluctuation of the turbocharger for the individual engine cylinder is based on the crankshaft position during the sensed speed fluctuation of the turbocharger corresponding to the individual cylinder.

As one example, adjusting operation of the individual engine cylinder may include adjusting fueling to the individual engine cylinder in response to the magnitude of the of the sensed speed fluctuation of the turbocharger corresponding to the individual engine cylinder being outside of a first determined range. As another example, adjusting operation of the individual engine cylinder includes adjusting exhaust valve timing of an exhaust valve of the individual engine cylinder in response to the timing of the sensed speed fluctuation of the turbocharger corresponding to the individual engine cylinder being outside of a second determined range. The method may further comprise indicating degradation of the individual engine cylinder in response to the magnitude or timing of the sensed speed fluctuation of the turbocharger being outside of the determined ranges. As another example, the method may further comprise confirming degradation of the individual engine cylinder based on an instantaneous speed fluctuation of a crankshaft of the engine.

As yet another embodiment, an engine comprises a turbocharger speed sensor and a controller communicatively coupled to the turbocharger speed sensor and having a non-transitory memory with computer-readable instructions configured to: adjust an operation of an individual cylinder of a plurality of cylinders based on a sensed operating parameter of the individual engine cylinder, where the operating parameter is based at least in part on a turbocharger speed fluctuation output by the turbocharge speed sensor that is correlated with a crankshaft position of a crankshaft of the engine. In one example, the plurality of cylinders includes a first set of non-donor cylinders configured to provide exhaust to an exhaust passage of the engine including a turbocharger turbine and a second set of donor cylinders adapted to provide exhaust to each of the exhaust passage and an intake passage of the engine and when the individual cylinder is one of the second set of donor cylinders, only adjusting operation of the individual cylinder based on the sensed operating parameter when the second set of donor cylinders are providing exhaust to the exhaust passage.

As used herein, an element or step recited in the singular and proceeded with the word "a" or "an" should be understood as not excluding plural of said elements or steps, unless such exclusion is explicitly stated. Furthermore, references to "one embodiment" of the invention do not exclude the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for an engine, comprising:
adjusting engine operation based on an indicated operating parameter of an individual engine cylinder, where the indicated operating parameter is determined based on a turbocharger speed fluctuation of a turbocharger correlated with crankshaft position of a crankshaft.

2. The method of claim 1, wherein the indicated operating parameter includes one or more of engine misfire, engine knock, total fueling amount that is above or below a threshold value range, fueling ratio between a first and second fuel in a multi-fuel system, degradation of the individual engine cylinder, degradation of a fuel injector that is configured to supply fuel to the individual engine cylinder, or degradation of an exhaust valve of the individual engine cylinder.

3. The method of claim 1, wherein the turbocharger speed fluctuation of the turbocharger is an instantaneous turbocharger speed fluctuation of the turbocharger; and, further comprising determining a magnitude and timing of the instantaneous turbocharger speed fluctuation for the individual engine cylinder and determining the indicated operating parameter of the individual engine cylinder based on one or more of the determined magnitude being outside of a first threshold range or the timing being outside of a second threshold range.

4. The method of claim 3, wherein the first threshold range is based at least in part on an average magnitude of the instantaneous turbocharger speed fluctuation for each and every engine cylinder and the crankshaft position.

5. The method of claim 3, further comprising synchronizing the instantaneous turbocharger speed fluctuation to the crankshaft position and determining the individual cylinder that corresponds to the instantaneous turbocharger speed fluctuation based on a cylinder firing order of the engine.

6. The method of claim 5, wherein adjusting engine operation includes adjusting fueling to the individual engine cylinder in response to the magnitude of the instantaneous turbocharger speed fluctuation for the individual engine cylinder being outside of the first threshold range.

7. The method of claim 6, further comprising indicating degradation of the individual engine cylinder in response to the magnitude of the instantaneous turbocharger speed fluctuation for the individual engine cylinder being outside of a third threshold range, the third threshold range greater than the first threshold range.

8. The method of claim 5, wherein adjusting engine operation includes one or more of adjusting valve timing or indicating degradation of an exhaust valve of the individual engine cylinder in response to the timing of the instantaneous turbocharger speed fluctuation for the individual engine cylinder being outside of the second threshold range.

9. The method of claim 1, further comprising confirming the indicated operating parameter based on instantaneous speed fluctuations of the crankshaft.

10. The method of claim 1, wherein the turbocharger speed fluctuation of the turbocharger is determined from a time-varying output of a turbocharger speed sensor and further comprising adjusting the turbocharger speed fluctuation based on a position of a turbine bypass valve positioned in a bypass passage around a turbine of the turbocharger.

11. The method of claim 1, further comprising determining if the turbocharger is in a surge state, and if not in the surge state then determining the indicated operating parameter and adjusting engine operation based on the indicated operating parameter.

12. The method of claim 11, further comprising determining that exhaust from a plurality of donor cylinders is flowing to a turbine of the turbocharger, wherein the plurality of donor cylinders are collectively configured to route exhaust gas to an exhaust passage and therethrough to an intake passage to an air supply for the engine, and if so then diagnosing the individual donor cylinder that is part of the plurality of donor cylinders.

13. The method of claim 1, wherein the indicated operating parameter is determined based on plural turbocharger speed fluctuations of the turbocharger each correlated with the crankshaft position of the crankshaft, the crankshaft position being associated with the individual engine cylinder, and the plural turbocharger speed fluctuations being associated with firing of the same individual engine cylinder.

14. A method for an engine, comprising:
adjusting operation of an individual engine cylinder in response to one or both of a magnitude of a sensed speed fluctuation of a turbocharger being outside a first range or a timing of the sensed speed fluctuation being outside a second range, in which the sensed speed fluctuation corresponds to the individual engine cylinder, where the one or both of the magnitude or the timing of the sensed speed fluctuation of the turbocharger is based at least in part on an output of a turbocharger speed sensor and a crankshaft position of a crankshaft.

15. The method of claim 14, wherein the first range of the magnitude of the sensed speed fluctuation of the turbocharger for the individual engine cylinder is determined based on an average magnitude of the sensed speed fluctuation of the turbocharger for all cylinders of the engine and wherein the second range of the timing of the sensed speed fluctuation of the turbocharger for the individual engine cylinder is determined based on the crankshaft position during the sensed speed fluctuation of the turbocharger corresponding to the individual cylinder.

16. The method of claim 14, wherein adjusting operation of the individual engine cylinder includes adjusting fueling to the individual engine cylinder in response to the magnitude of the sensed speed fluctuation of the turbocharger corresponding to the individual engine cylinder being outside of the first range.

17. The method of claim 14, wherein adjusting operation of the individual engine cylinder includes adjusting exhaust valve timing of an exhaust valve of the individual engine cylinder in response to the timing of the sensed speed fluctuation of the turbocharger corresponding to the individual engine cylinder being outside of the second range.

18. The method of claim 14, further comprising indicating degradation of the individual engine cylinder in response to the magnitude or timing of the sensed speed fluctuation of the turbocharger being outside of the first or second ranges, respectively.

19. The method of claim 18, further comprising confirming the degradation of the individual engine cylinder based on an instantaneous speed fluctuation of the crankshaft of the engine.

20. An engine, comprising:
a turbocharger speed sensor; and
a controller communicatively coupled to the turbocharger speed sensor and having a non-transitory memory with computer-readable instructions configured to:
adjust an operation of an individual cylinder of a plurality of cylinders based on a sensed operating parameter of the individual engine cylinder, where the sensed operating parameter is determined based at least in part on a turbocharger speed fluctuation output by the turbocharger speed sensor that is correlated with a crankshaft position of a crankshaft of the engine.

21. The engine of claim 20, wherein the plurality of cylinders includes a first set of non-donor cylinders configured to provide exhaust to an exhaust passage of the engine including a turbocharger turbine and a second set of donor cylinders adapted to provide exhaust to each of the exhaust passage and an intake passage of the engine and when the individual cylinder is one of the second set of donor cylinders, only adjusting operation of the individual cylinder based on the sensed operating parameter when the second set of donor cylinders are providing exhaust to the exhaust passage.

* * * * *